United States Patent [19]
Corney

[11] Patent Number: 5,974,739
[45] Date of Patent: Nov. 2, 1999

[54] CLIP FOR DOOR SEAL

[75] Inventor: Robert F. Corney, Canton, Mich.

[73] Assignee: The Standard Products Company, Cleveland, Ohio

[21] Appl. No.: 08/956,523

[22] Filed: Oct. 23, 1997

[51] Int. Cl.$^6$ ............................................. E06B 7/16
[52] U.S. Cl. ............................................. 49/493.1; 24/293
[58] Field of Search ............................ 49/489.1, 492.1, 49/493.1, 475.1; 52/716.5, 716.6, 716.7; 24/293, 295, 462

[56] References Cited

U.S. PATENT DOCUMENTS

| | | |
|---|---|---|
| 2,689,027 | 9/1954 | Flora .................................. 24/295 X |
| 2,898,648 | 8/1959 | Bright ............................... 49/492.1 X |
| 3,203,059 | 8/1965 | Becker ...................................... 24/295 |
| 4,026,598 | 5/1977 | Koike . |
| 4,092,766 | 6/1978 | Meyer ...................................... 24/295 |

FOREIGN PATENT DOCUMENTS

| | | | |
|---|---|---|---|
| 781200 | 8/1957 | United Kingdom ..................... 52/718 |
| 796716 | 6/1958 | United Kingdom ................. 52/716.7 |

*Primary Examiner*—Jerry Redman
*Attorney, Agent, or Firm*—Harness, Dickey & Pierce, P.L.C.

[57] ABSTRACT

A clip for securely retaining a weatherstrip in the upper mounting channel of an upper door frame of an automotive vehicle is described. The clip possesses a plurality of tines that engage various portions of the weatherstrip and the upper mounting channel so as to provide a resistive force against a dislodging force.

18 Claims, 1 Drawing Sheet

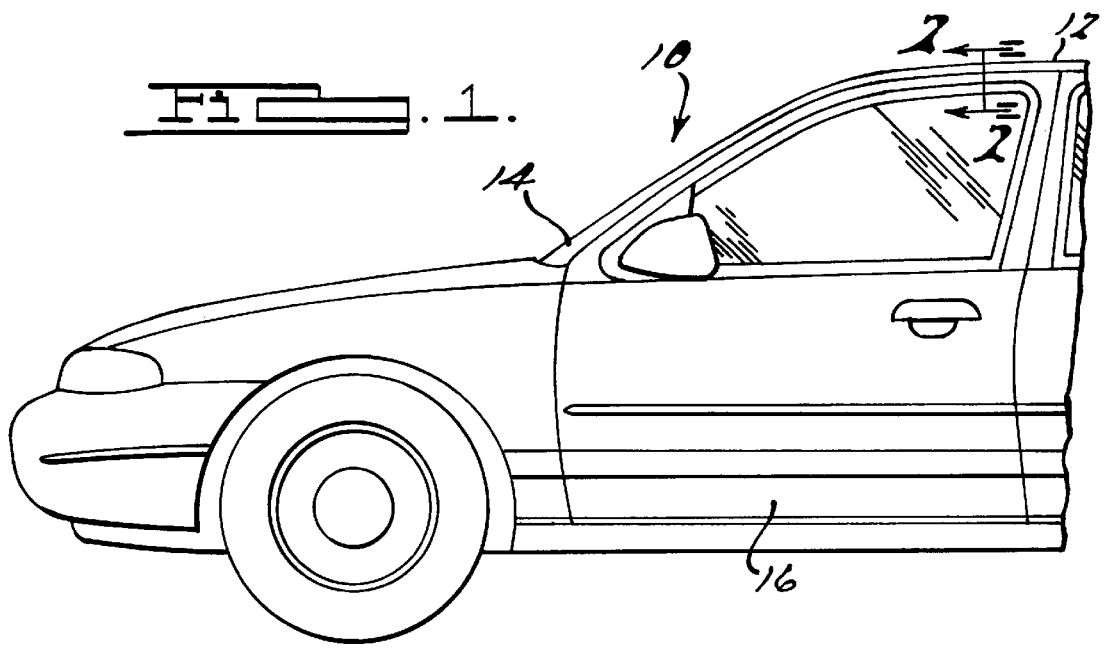
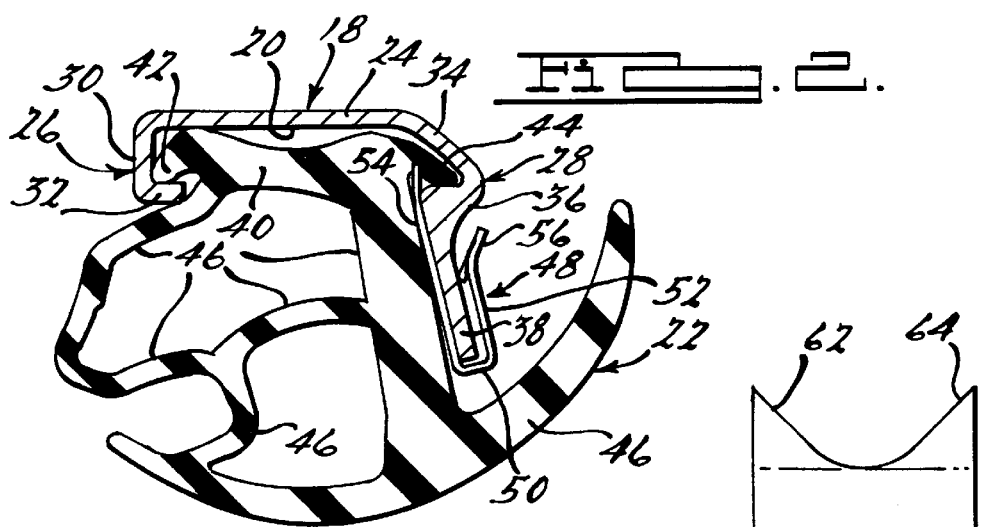
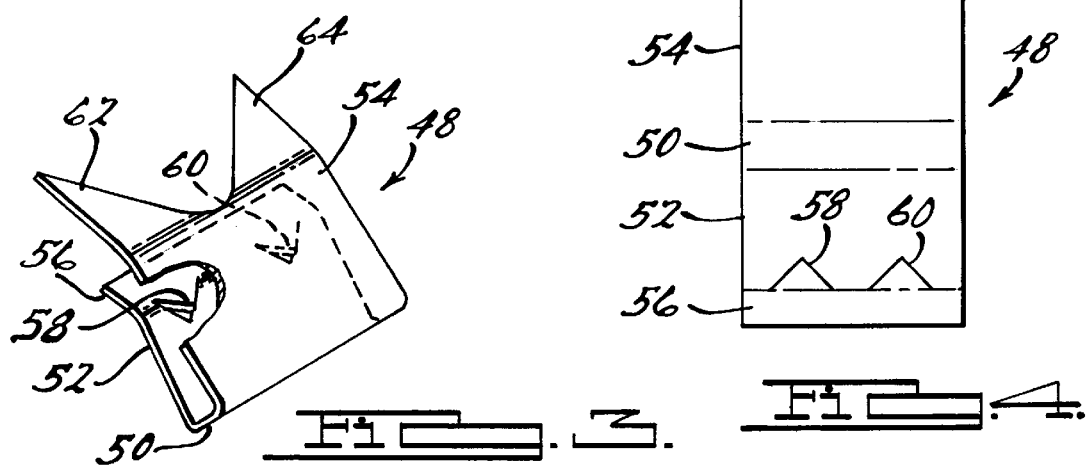

CLIP FOR DOOR SEAL

FIELD OF THE INVENTION

This invention relates generally to weatherstrips for automotive vehicles, and specifically to a clip for securely retaining the weatherstrip in a mounting channel of an automotive vehicle.

BACKGROUND OF THE INVENTION

Conventionally, a weatherstrip of an elongate resiliently deformable strip is attached to an upper door frame on a door or to the adjacent jamb structure of a vehicle body in order to seal the clearance space between the upper door frame and the adjacent jamb structure in the closed position of the door and also to serve as a cushioning member upon closing of the door. A known door seal construction uses a weatherstrip having a base portion and a lip portion extending from the base section. In this door seal construction, the weatherstrip is attached to an upper door frame member on a door with the base portion fitting in an upper mounting channel of the upper door frame member in such a manner that the lip portion will yieldably engage the adjacent jamb structure of a vehicle body when the door is closed.

However, this construction permits the weatherstrip to be relatively easily dislodged from the mounting channel, thus adversely affecting the integrity of the door seal. Additionally, this construction permits unwanted lateral movement of the weatherstrip in the mounting channel. As a result, water, dirt, and wind can penetrate the door seal and potentially damage various structures of the automotive vehicle.

Therefore, there is a need for an apparatus for securely retaining a weatherstrip in a mounting channel, such as an upper mounting channel of an upper door frame of an automotive vehicle.

SUMMARY OF THE INVENTION

An object of the present invention is to provide an apparatus to securely retain a weatherstrip in a mounting channel.

Another object of the present invention is to provide an apparatus to securely retain a weatherstrip in an upper mounting channel of an upper door frame or a body door frame environment or a convertible top retainer of an automotive vehicle.

A further object of the present invention is to provide a clip to securely retain a weatherstrip in an upper mounting channel of an upper door frame or a body door frame environment or a convertible top retainer of an automotive vehicle.

A still further object of the present invention is to provide a clip having a plurality of tines to securely retain a weatherstrip in an upper mounting channel of an upper door frame or a body door frame environment or a convertible top retainer of an automotive vehicle.

In accordance with one embodiment of the present invention, an apparatus for securely retaining a weatherstrip in a mounting channel comprises:

a clip, the clip having a first wall and a second wall, the first wall having a plurality of tines on the first wall for resisting a dislodging force, the second wall having a plurality of tines on the second wall for resisting a dislodging force.

In accordance with another embodiment of the present invention, an apparatus for securely retaining a weatherstrip in a mounting channel comprises:

a base;

a first wall, the first wall extending upwardly from the base, the first wall having an inner surface and an outer surface, the first wall having a plurality of tines on the inner surface; and a second wall, the second wall extending upwardly from the base, the second wall being opposed and spaced apart from the first wall, the second wall having a top surface, the second wall having a plurality of tines on the top surface.

In accordance with yet another embodiment of the present invention, a door seal apparatus comprises:

a mounting channel;

a weatherstrip, the weatherstrip being disposed within the mounting channel; and a clip, the clip engaging the mounting channel and the weatherstrip, the clip comprising:

a base;

a first wall, the first wall extending upwardly from the base, the first wall having an inner surface and an outer surface, the first wall having a plurality of tines on the inner surface; and a second wall, the second wall extending upwardly from the base, the second wall being opposed and spaced apart from the first wall, the second wall having a top surface, the second wall having a plurality of tines on the top surface.

A more complete appreciation of the present invention and its scope can be obtained from understanding the accompanying drawings, which are briefly summarized below, the followed detailed description of the invention, and the appended claims.

BRIEF DESCRIPTION OF THE DRAWINGS

FIG. 1 is a partial side elevational view of an automotive vehicle illustrating the general location of the door seal, the weatherstrip, and the clip, in accordance with one aspect of the present invention.

FIG. 2 is a sectional view taken along line 2—2 of FIG. 1 illustrating the door seal, the weatherstrip, and the clip, in accordance with one aspect of the present invention.

FIG. 3 is a partial broken away perspective view of the clip, in accordance with one aspect of the present invention.

FIG. 4 is a plan view illustrating a blank of the clip shown in FIG. 3, in accordance with one aspect of the present invention.

DETAILED DESCRIPTION OF THE INVENTION

Referring to the accompanying drawings, like reference numerals are used for like parts throughout all Figures.

Referring now in detail to the drawings, and more particularly to FIG. 1, the numeral 10 denotes generally an automotive vehicle including a door seal constructed in accordance with the present invention. The vehicle 10 includes a body structure such as a roof 12, a windshield 14, and a door 16. The door 16 is conventionally hinged at its forward edge to a body pillar section, but could also be hinged from the rearward pillar.

Referring now particularly to FIG. 2, door 16 comprises an upper door window frame member 18. Upper frame member 18 includes an upper mounting channel 20 for receiving and retaining a weatherstrip 22. It should be appreciated that upper frame member 18 would normally also include an oppositely opening lower mounting channel for receiving and retaining a glass run channel. Upper mounting channel 20 has a pair of upwardly extending rib members or sections 26 and 28. It should also be appreciated that the present invention can be practiced with any type of mounting channel, regardless of its orientation. Therefore, the present invention could be practiced on either outwardly, upwardly, inwardly, or outwardly oriented rib members or sections.

Rib section 26 is generally L-shaped and includes a vertical portion extending upwardly away from base wall 24 and a horizontal portion 32 extending inwardly toward upper mounting channel 20 and being substantially parallel to base wall 24. This vertical portion acts as a protuberance or flange 30 to engage a portion of weatherstrip 22.

Rib section 28 is generally S-shaped and includes a lower portion 34 extending upwardly and outwardly away from base wall 24, a middle portion extending inwardly toward mounting channel 20, and an upper portion 38 extending upwardly and outwardly away from base wall 24. Because the middle portion is substantially thicker than lower portion 34 or upper portion 38, it acts as a protuberance or flange 36 to engage a portion of the weatherstrip 22.

Weatherstrip 22 extends along upper mounting channel 20 and includes an elongated resiliently deformable strip having a base portion 40 seated on base wall 24, a first lip portion 42 and a second lip portion 44. Weatherstrip 22 further includes a plurality of generally upwardly and/or transversely extending resiliently deformable members 46 which aid in forming a seal between the upper portion of door 16 and roof 12 against the infiltration of water, dirt, and wind. It should be appreciated lip 42 is abutted by flange 32 and lip 44 is abutted by flange 36, thus retaining weatherstrip 22 in upper mounting channel 20. However, as previously mentioned, this type of construction permits weatherstrip 22 to be relatively easily dislodged from upper mounting channel 20. Additionally, this type of construction permits weatherstrip 22 to move laterally within upper mounting channel 20.

Therefore, in accordance with one embodiment of the present invention, a clip 48 is employed to securely retain weatherstrip 22 in place in upper mounting channel 20, so as to prevent unwanted lateral or vertical movement of weatherstrip 22. It should be appreciated that, if necessary, more than one clip 48 may be employed to securely retain weatherstrip 22 in place in upper mounting channel 20. The number and placement of the individual clips 48 will be determined in large part by the particular configuration and length of the weatherstrip/mounting channel assembly.

Referring now particularly to FIG. 3, a clip in accordance with one embodiment of the present invention is illustrated. Clip 48 is a substantially U-shaped member which may be comprised of metallic, ceramic, plastic, other suitable materials, or combinations of these materials. Clip 48 consists primarily of a base portion 50, a first upwardly extending wall 52 and a second upwardly extending wall 54. Clip 48 may be comprised of a material or materials that range from being substantially flexible to being substantially rigid, depending upon the particular application. If the material or materials are substantially flexible, they should have sufficient memory to return to their original design structure or position after flexing or biasing has ceased.

The upper portion 56 of wall 52 is angled slightly outwardly away from wall 52. At the point where the upper portion 56 of wall 52 begins to angle outwardly away, a plurality of downwardly facing members 58 and 60 are provided. Members 58 and 60 may be any type of projection or protuberance, but are preferably barbs or tines. Members 58 and 60 face inwardly toward wall 54 and downwardly toward base portion 50. In an alternative embodiment, members 58 and 60 can be angled so as to face outwardly away from wall 54 and downwardly toward base portion 50. In yet another alternative embodiment, a plurality of members may be angled in different positions, some facing outwardly away from wall 54 and downwardly toward base portion 50, and some facing inwardly toward wall 54 and downwardly toward base portion 50.

At the top of wall 54, members 62 and 64 are provided. Members 62 and 64 may be any type of projection or protuberance, but are preferably barbs or tines. Members 62 and 64 are angled slightly upwardly away from base portion 50 and inwardly toward wall 52.

It should be appreciated that the exact shape, length, or number of members 58, 60, 62, and 64 are not critical, provided that they properly engage the various portions of the door seal assembly in the manner envisioned by the present invention.

Referring now particularly to FIG. 4, a blank form of a clip in accordance with one embodiment of the present invention is illustrated. The particular individual features of clip 48 can be more readily identified in the blank form of clip 48. It should be appreciated that the blank form needs to be processed further (i.e., shaped) in order to make clip 48, in accordance with one embodiment of the present invention.

In operation, clip 48 is placed over rib 28 so that base 50 preferably abuts the uppermost portion of upper portion 38. Preferably, wall 54 should be tightly received in the area between rib 28 and the adjacent member 46 of weatherstrip 22. In this position, members 62 and 64 preferably engage lip 44 in that members 62 and 64 penetrate into lip 44, preferably no more than ⅔ of the width of lip 44. By the term "engage" it is meant that the respective members abut, penetrate, or otherwise physically contact a surface or portion of either weatherstrip 22 or upper portion 38, as the case may be. Simultaneously, members 58 and 60 preferably engage an area of upper portion 38. Although members 58 and 60 may penetrate upper portion 38 to a minor extent, it is not believed that any significant damage will be done to upper portion 38 of upper frame member 18.

Without being bound to a particular theory of the operation of the present invention, it is the primary purpose of members 58 and 60 to provide a sufficient amount of resistive force should a dislodging force be applied to clip 48. A dislodging force is meant to include any force, regardless of its source, location, or direction, that is used to either laterally move or remove or attempt to remove any portion of either weatherstrip 22 or clip 48 from upper mounting channel 20. A resistive force is meant to include any force, regardless of its source, location, or direction, that is used to prevent or impede either the lateral movement or the removal or attempted removal of either weatherstrip 22 or clip 48 from upper mounting channel 20. Therefore, if a dislodging force is applied to clip 48, clip 48 will be prevented from moving away from upper frame member 18 due to the fact that members 58 and 60 abut upper portion 38, thereby providing a resistive force against the dislodging force being applied to clip 48.

Without being bound to a particular theory of the operation of the present invention, it is the primary purpose of members 62 and 64 to provide a sufficient amount of resistive force should a dislodging force be applied to weatherstrip 22. Therefore, if a dislodging force, such as a vertical dislodging force, is applied to weatherstrip 22, weatherstrip 22 will be prevented from moving away from upper mounting channel 20 due to the fact that members 62 and 64 abut weatherstrip 22 and flange 36, thereby providing a resistive force against the dislodging force being applied to weatherstrip 22. Additionally, it should be appreciated that members 58 and 60 also provide a resistive force against a dislodging force being applied to weatherstrip 22. Furthermore, if a lateral or horizontal dislodging force is applied to weatherstrip 22, members 62 and 64 will provide a resistive force so as to prevent or impede any lateral or horizontal movement of weatherstrip 22.

It should be appreciated that clip 48 can be removed from the weatherstrip/mounting channel assembly by biasing wall 52 away from upper portion 38. As a result, tines 58 and 60 are no longer able to engage upper portion 38 when a dislodging force is applied to clip 48. Thus, in this position, clip 48 can be removed from the weatherstrip/mounting channel assembly.

It should also be noted that the clip of the present invention may be employed on the door seals of convertible automotive vehicles, as well as those automotive vehicles possessing a hardtop roof. Additionally, it should be appreciated that the clip of the present invention may be employed on any weatherstrip/mounting channel assembly regardless of its location or placement on the automotive vehicle. Furthermore, it should be appreciated that the clip of the present invention may be employed on any weatherstrip/mounting channel assembly of any apparatus.

The foregoing description is considered illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

What is claimed is:

1. An apparatus for use in combination with a weatherstrip and a mounting channel having an inner and an outer surface, wherein the weatherstrip is disposed on at least a portion of the inner surface of the mounting channel, comprising:
    a single U-shaped clip having substantially parallel first and second spaced and opposed walls, said first wall being adjacent to the outer surface of the mounting channel, said first wall having a plurality of tines disposed on said first wall for engaging a portion of the outer surface of the mounting channel in order to resist a dislodging force, said second wall being adjacent to the inner surface of the mounting channel, said second wall having a plurality of tines disposed on said second wall for engaging a portion of the weatherstrip in order to resist a dislodging force;
    wherein said tines of said second wall penetrate the weatherstrip and retain the weatherstrip within the mounting channel.

2. An apparatus in accordance with claim 1, wherein said plurality of tines of said first wall face inwardly toward said second wall.

3. An apparatus in accordance with claim 1, wherein said plurality of tines of said second wall face inwardly toward said first wall.

4. An apparatus in accordance with claim 1, wherein said plurality of tines of said second wall face outwardly away from said first wall.

5. An apparatus in accordance with claim 1, wherein said clip is comprised of materials selected from the group consisting of metals, ceramics, plastics, and combinations thereof.

6. An apparatus in accordance with claim 1, wherein the mounting channel is an upper mounting channel of an upper door frame of an automotive vehicle.

7. A single U-shaped clip for use in combination with a weatherstrip and a mounting channel having an inner and an outer surface, wherein the weatherstrip is disposed on at least a portion of the inner surface of the mounting channel, comprising:
    a base;
    a first wall extending upwardly from said base, said first wall being adjacent to the outer surface of the mounting channel, said first wall having an inner surface and an outer surface, said first wall having a plurality of tines disposed on said inner surface, said plurality of tines of said first wall engaging a portion of the outer surface of the mounting channel; and
    a second wall extending upwardly from said base, said second wall being adjacent to the inner surface of the mounting channel, said second wall being opposed and spaced apart from said first wall, said second wall being substantially parallel to said first wall, said second wall having a top surface, said second wall having a plurality of tines disposed on said top surface, said plurality of tines of said second wall engaging a portion of the weatherstrip;
    wherein said tines of said second wall penetrate the weatherstrip and retain the weatherstrip within the mounting channel.

8. An apparatus in accordance with claim 7, wherein said plurality of tines of said first wall face downwardly toward said base, and wherein said plurality of tines of said first wall face inwardly toward said second wall.

9. An apparatus in accordance with claim 7, wherein said plurality of tines of said second wall face upwardly away from said base, and wherein said plurality of tines of said second wall face inwardly toward said first wall.

10. An apparatus in accordance with claim 7, wherein said plurality of tines of said second wall face upwardly away from said base, and wherein said plurality of tines of said second wall face outwardly away from said first wall.

11. An apparatus in accordance with claim 7, wherein said clip is comprised of materials selected from the group consisting of metals, ceramics, plastics, and combinations thereof.

12. An apparatus in accordance with claim 7, wherein the mounting channel is an upper mounting channel of an upper door frame of an automotive vehicle.

13. A door seal apparatus, comprising:
    a mounting channel having an inner and an outer surface;
    a weatherstrip disposed on at least a portion of the inner surface of said mounting channel; and
    a singe U-shaped clip engaging said mounting channel and said weatherstrip, said clip comprising:
    a base;
    a first wall extending upwardly from said base, said first wall being adjacent to the outer surface of the mounting channel, said first wall having an inner surface and an outer surface, said first wall having a plurality of tines disposed on said inner surface, said plurality of tines of said first wall engaging a portion of the outer surface of said mounting channel; and
    a second wall extending upwardly from said base, said second wall being adjacent to the inner surface of the mounting channel, said second wall being opposed and spaced apart from said first wall, said second wall being substantially parallel to said first wall, said second wall having a top surface, said second wall having a plurality of tines disposed on said top surface, said plurality of tines of said second wall engaging a portion of said weatherstrip;

wherein said tines of said second wall penetrate said weatherstrip and retain said weatherstrip within said mounting channel.

14. An apparatus in accordance with claim 13, wherein said plurality of tines of said first wall face downwardly toward said base, and wherein said plurality of tines of said first wall face inwardly toward said second wall.

15. An apparatus in accordance with claim 13, wherein said plurality of tines of said second wall face upwardly away from said base, and wherein said plurality of tines of said second wall face inwardly toward said first wall.

16. An apparatus in accordance with claim 13, wherein said plurality of tines of said second wall face upwardly away from said base, and wherein said plurality of tines of said second wall face outwardly away from first wall.

17. An apparatus in accordance with claim 13, wherein said clip is comprised of materials selected from the group consisting of metals, ceramics, plastics, and combinations thereof.

18. An apparatus in accordance with claim 13, wherein there fore mounting channel is an upper mounting channel of an upper door frame of an automotive vehicle.

* * * * *